United States Patent
Tuffs et al.

(10) Patent No.: US 10,286,813 B1
(45) Date of Patent: May 14, 2019

(54) FORWARD MEMBER AND HARNESS ENGAGEMENT ELEMENT TO MANIPULATE WIRING HARNESS BETWEEN UNDERSIDE OF A SEAT AND FLOOR OF A VEHICLE

(71) Applicant: Ford Global Technologies, LLC, Dearborn, MI (US)

(72) Inventors: Shawn Tuffs, Wayne, MI (US); Jason Jarvis, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/872,515

(22) Filed: Jan. 16, 2018

(51) Int. Cl.
| | | |
|---|---|---|
| *B60N 2/07* | (2006.01) | |
| *B60R 16/027* | (2006.01) | |
| *B60R 16/02* | (2006.01) | |
| *B60R 16/03* | (2006.01) | |

(52) U.S. Cl.
CPC .......... *B60N 2/0722* (2013.01); *B60R 16/027* (2013.01); *B60R 16/0207* (2013.01); *B60R 16/03* (2013.01)

(58) Field of Classification Search
CPC ............ B60R 16/0207; B60R 16/0215; B60R 16/027; B60N 2/0722
USPC ............. 296/65.01, 65.13; 174/72 A; 439/34
See application file for complete search history.

(56) References Cited

U.S. PATENT DOCUMENTS

| | | | |
|---|---|---|---|
| 6,997,499 B2 | 2/2006 | Tsubaki et al. | |
| 7,829,789 B2 | 11/2010 | Yamaguchi | |
| 9,573,536 B2 | 2/2017 | Katou et al. | |
| 9,744,880 B2* | 8/2017 | Jamieson | ............... B60N 2/682 |
| 9,843,178 B2* | 12/2017 | Terada | .................. B60R 16/027 |
| 2006/0084293 A1 | 4/2006 | Jeong | |
| 2008/0142260 A1* | 6/2008 | Yamaguchi | .......... B60N 2/0224 174/72 A |
| 2011/0048761 A1* | 3/2011 | Terada | ................ B60R 16/0215 174/68.3 |
| 2012/0168225 A1* | 7/2012 | Satou | ........................ B60N 2/06 174/70 R |
| 2014/0159447 A1* | 6/2014 | Saitou | ....................... B60N 2/70 297/217.3 |
| 2014/0339376 A1 | 11/2014 | Katou et al. | |

FOREIGN PATENT DOCUMENTS

| | | | | |
|---|---|---|---|---|
| EP | 1138555 B1 | 11/2004 | | |
| JP | 2014231269 A | * 12/2014 | ............. | B60R 16/02 |

* cited by examiner

*Primary Examiner* — Jason S Morrow
(74) *Attorney, Agent, or Firm* — Vichit Chea; Price Heneveld LLP

(57) ABSTRACT

A vehicle comprises: a floor portion; a seating assembly disposed above and positionable relative to the floor portion, the seating assembly comprising: a seat including an underside opposing the floor portion; a wiring harness extending between the underside of the seat and the floor portion, the wiring harness extending from the underside of the seat at a first point and extending from the floor portion at a second point; a forward member with a first portion attached to the underside of the seat and a second portion engaged with the wiring harness; and a harness engagement element extending from the underside of the seat and engaging the wiring harness between the underside of the seat and the floor portion. The harness engagement element engages the wiring harness between the first point and the second point of the wiring harness.

20 Claims, 7 Drawing Sheets

FORWARD MEMBER AND HARNESS ENGAGEMENT ELEMENT TO MANIPULATE WIRING HARNESS BETWEEN UNDERSIDE OF A SEAT AND FLOOR OF A VEHICLE

FIELD OF THE INVENTION

The present invention generally relates to the manipulation of a wiring harness extending between the underside of a seat of a vehicle seating assembly and a floor portion beneath the underside of the seat, in order to prevent the wiring harness from lying upon the floor portion and becoming visible to an occupant when the seating assembly is moved to a rearward position.

BACKGROUND OF THE INVENTION

A seating assembly, in some vehicles, may require electricity to power one or more motors that move the seating assembly forward or rearward, pivot a seatback relative to a seat, and adjust lumbar support, among other things. The seating assembly may additionally require electricity to provide heating or cooling to an occupant of the seating assembly. Further, the seating assembly may include various sensors that transmit data via wiring. The wiring used to supply electricity and to transmit data can be gathered together as a wiring harness and extended from an underside of the seat to the floor portion.

SUMMARY OF THE INVENTION

According to one aspect of the present invention, a vehicle comprises: a floor portion; a seating assembly disposed above and positionable relative to the floor portion, the seating assembly comprising: a seat including an underside opposing the floor portion; a wiring harness extending between the underside of the seat and the floor portion, the wiring harness extending from the underside of the seat at a first point and extending from the floor portion at a second point; elastic forward member with a first portion attached to the underside of the seat and a second portion engaged with the wiring harness; and a harness engagement element extending from the underside of the seat and engaging the wiring harness between the underside of the seat and the floor portion.

Embodiments of the first aspect of the invention can include any one or a combination of the following features:
  the harness engagement element engages the wiring harness between the first point and the second point of the wiring harness;
  the wiring harness is engaged with the forward member at an engagement point that is disposed between the first point and the second point;
  the harness engagement element engages the wiring harness between the second point and the engagement point where the wiring harness is engaged with the elastic member;
  the seating assembly has a forward position and a rearward position rearward of the forward position;
  the seating assembly is movable to, from, and between the forward position and the rearward position;
  the forward member is elastic;
  as the seating assembly is moved toward the forward position, the wiring harness causes the forward member to stretch;
  the harness engagement element includes a hoop portion with an opening through the hoop portion;
  the hoop portion at least partially surrounds the wiring harness with the wiring harness extending through the opening of the hoop portion;
  as the seating assembly is moved toward the forward position, the wiring harness moves through the opening of the hoop portion;
  as the seating assembly is moved from the forward position toward the rearward position, the forward member contracts;
  as the seating assembly is moved from the forward position toward the rearward position, the wiring harness moves within the opening of the hoop portion;
  as the seating assembly moves to the rearward position, the harness engagement element pulls a portion of the wiring harness rearward;
  when the seating assembly is in the rearward position, no portion of the wiring harness lies upon the floor portion; and
  when the seating assembly is in the rearward position, the harness engagement element causes a portion of the wiring harness to be disposed rearward of the second point where the wiring harness extends from the floor portion.

According to a second aspect of the present invention, a seating assembly comprises: a seat including an underside; a wiring harness extending from the underside of the seat at a first point and having a length extending to a second point; a forward member with a first portion attached to the underside of the seat and a second portion engaged with the wiring harness; and a harness engagement element extending from the underside of the seat and engaging the wiring harness below the underside of the seat.

Embodiments of the second aspect of the invention can include any one or a combination of the following features:
  the wiring harness is engaged with the forward member at an engagement point that is disposed between the first point and the second point;
  the harness engagement element engages the wiring harness between the first point and the second point of wiring harness;
  the harness engagement element engages the wiring harness between the second point and the engagement point where the wiring harness is attached to the elastic member;
  the harness engagement element includes a hoop portion with an opening through the hoop portion;
  the hoop portion of the harness engagement element at least partially surrounds the wiring harness with the wiring harness extending through the opening of the hoop portion; and
  the first portion of the forward member is forward of the harness engagement element, and the first point of the wiring harness is rearward of the harness engagement element.

These and other aspects, objects, and features of the present invention will be understood and appreciated by those skilled in the art upon studying the following specification, claims, and appended drawings.

DETAILED DESCRIPTION OF THE PREFERRED EMBODIMENTS

For purposes of description herein, the terms "above," "rearward," "forward," "downward," "below," "upward," and derivatives thereof shall relate to the disclosure as oriented in FIGS. 1 and 5. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
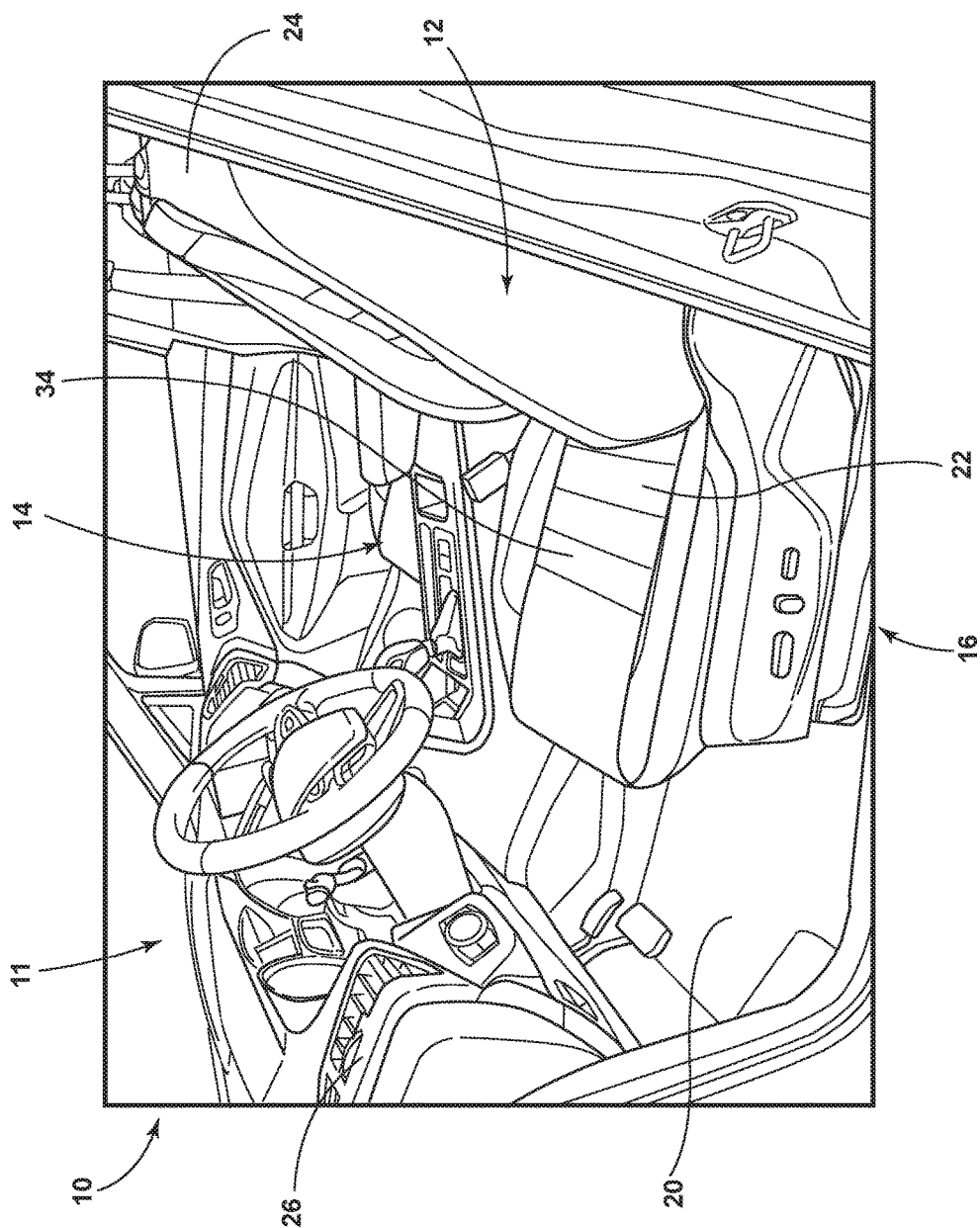
FIG. 1 is a perspective view of an interior of a vehicle, illustrating a first seating assembly disposed above a floor portion, and having a seat and a seatback.

Referring now to FIG. 1, a vehicle 10 includes an interior 11. A first seating assembly 12 and a second seating assembly 14 are disposed in the interior 11 and form a first row of seating 16. The vehicle 10 can include a second row of seating (not illustrated) rearward of the first row of seating 16, as well as additional rows of seating (not illustrated), rearward of the second row of seating. The vehicle 10 further includes a floor portion 20, above which the first seating assembly 12 and the second seating assembly 14 are disposed. Because the second seating assembly 14 can be identical in all respects to the first seating assembly 12 for purposes of this disclosure, only the first seating assembly 12 will be specifically discussed herein. The first seating assembly 12 includes a seat 22 and a seatback 24. During normal usage, an occupant (not illustrated) sits on the seat 22 with the seatback 24 supporting the occupant's back, while the occupant generally faces forward toward a dashboard 26 of the vehicle 10.

Figure 2:
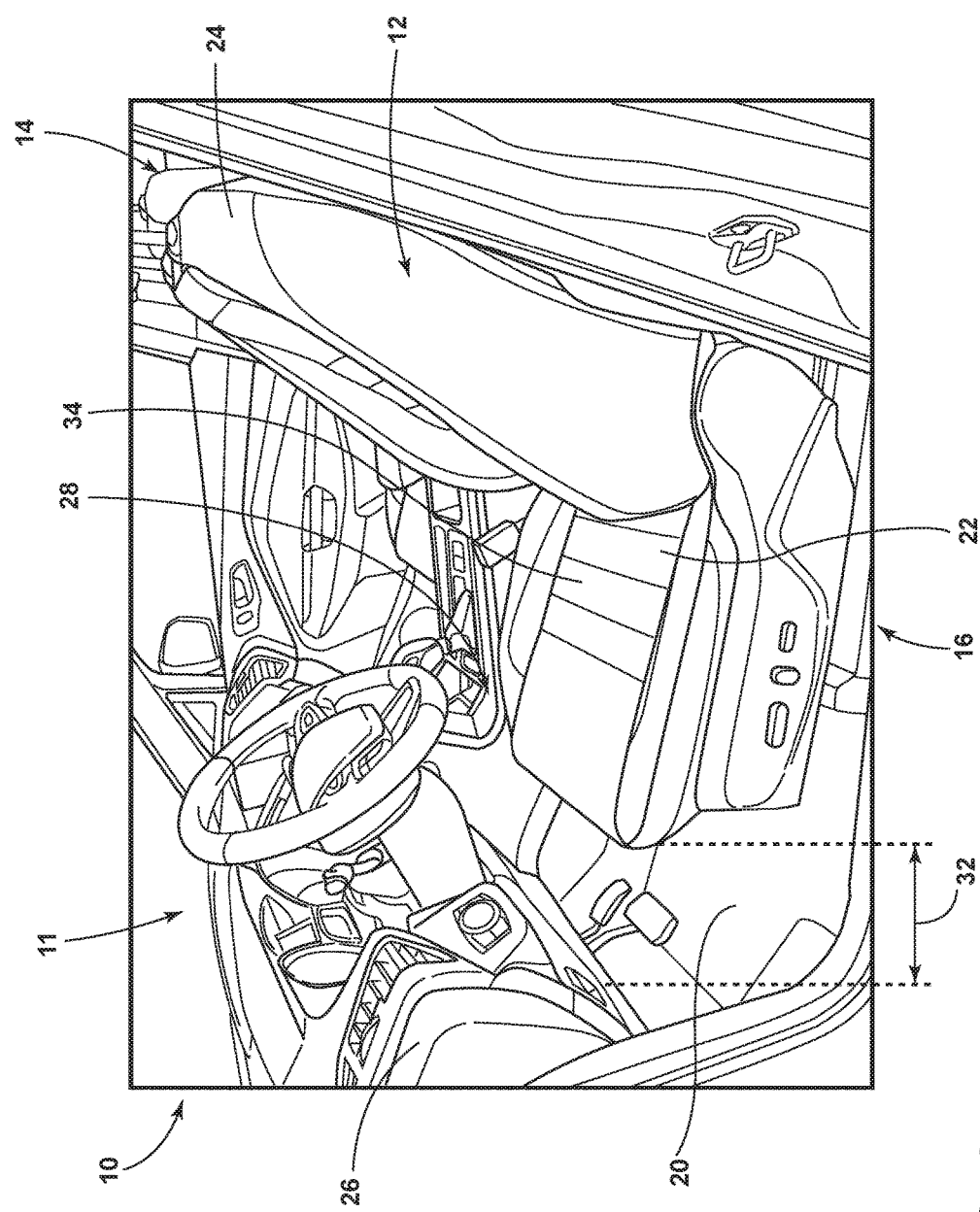
FIG. 2 is a perspective view of the interior of the vehicle of FIG. 1, illustrating the first seating assembly in a forward position.
Figure 3:
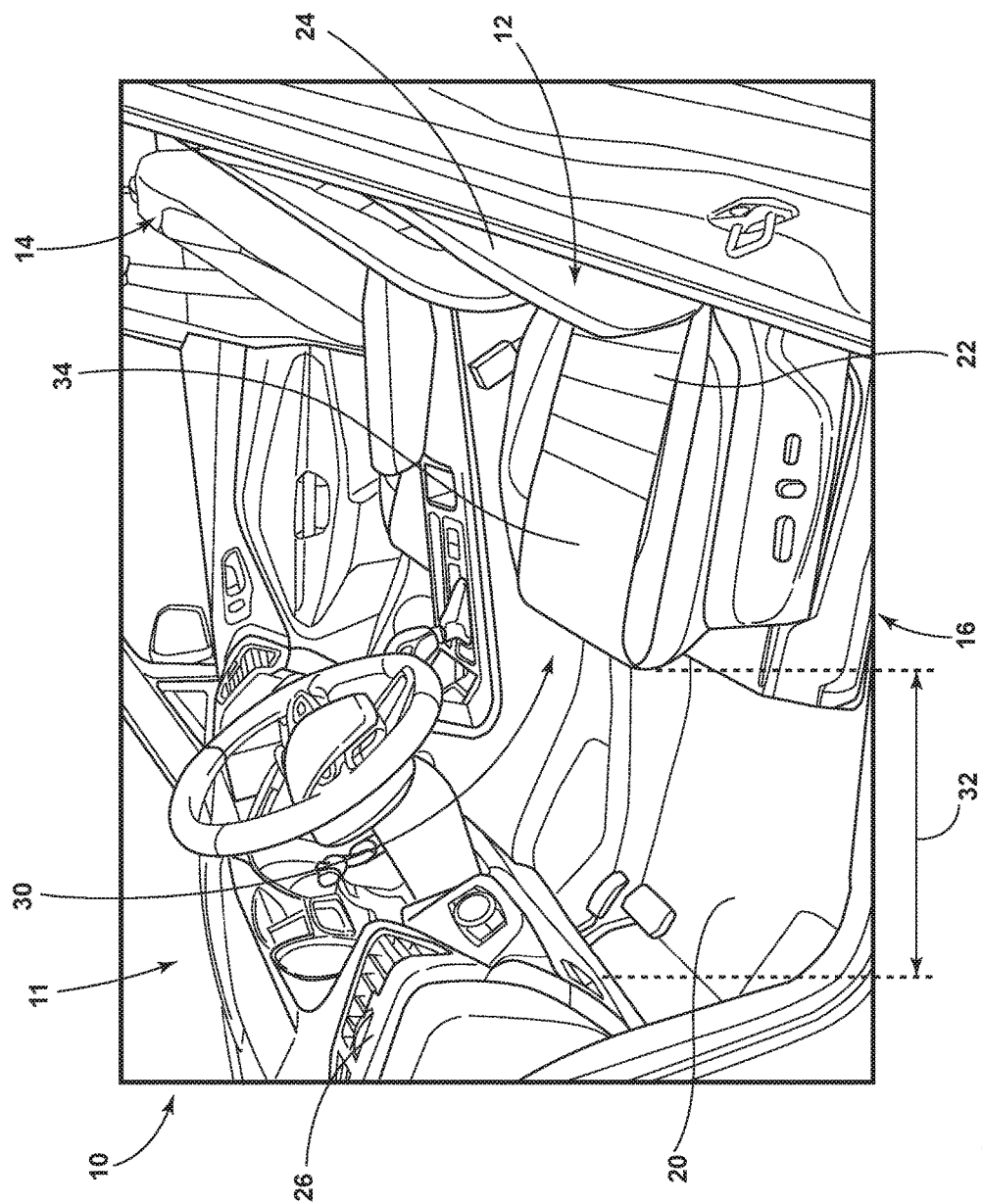
FIG. 3 is a perspective view of the interior of the vehicle of FIG. 1, illustrating the first seating assembly in a rearward position, where a distance between the seat and a dashboard is greater than when the first seating assembly is in the forward position as in FIG. 2.

Referring now to FIGS. 2 and 3, the first seating assembly 12 is positionable relative to the floor portion 20 and the dashboard 26. For example, the first seating assembly 12 has a forward position 28 (see in FIG. 2) and a rearward position 30 (see FIG. 3), which is rearward of the forward position 28. In other words, in the forward position 28, a distance 32 between the seat 22 and the dashboard 26 is less than the distance 32 between the seat 22 and the dashboard 26 when the first seating assembly 12 in the rearward position 30. The first seating assembly 12 is positionable and movable to, from, and between the forward position 28 and the rearward position 30.

Figure 4:
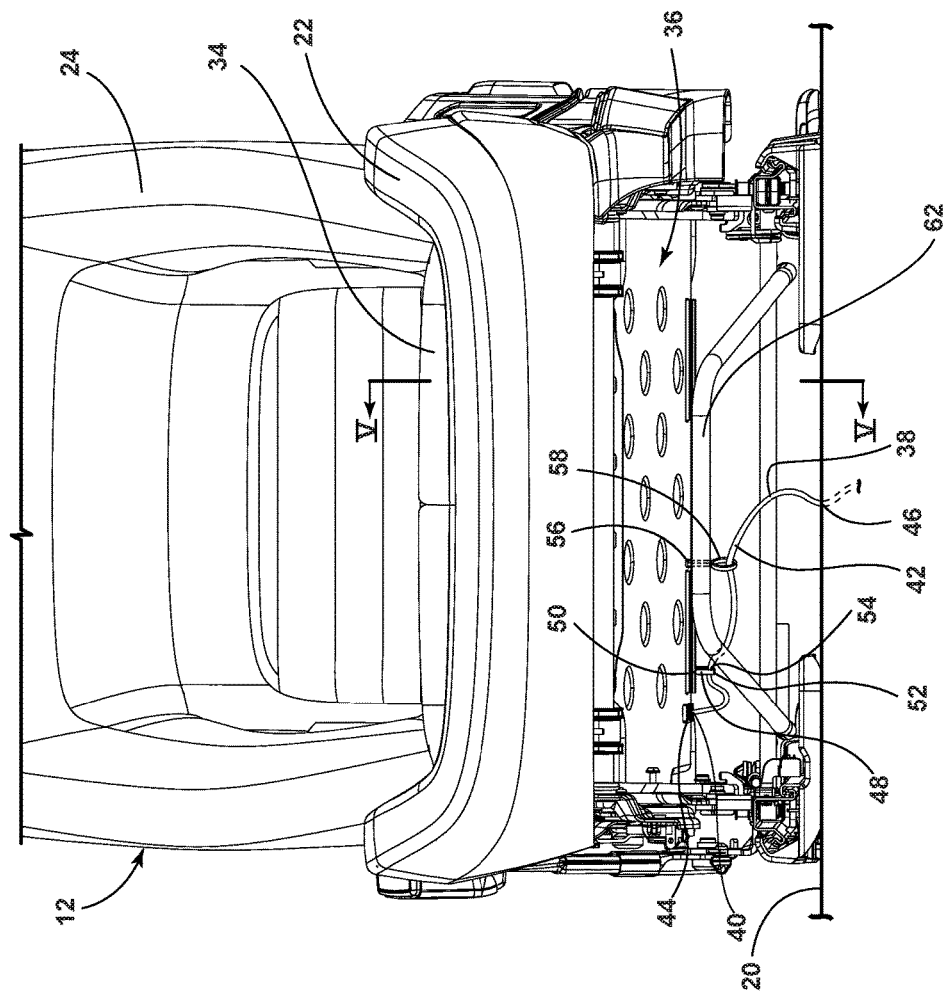
FIG. 4 is a front view of the first seating assembly of FIG. 1, illustrating an underside of the seat opposing the floor portion and a wiring harness having a length at least extending from the floor portion at a second point to the underside of the seat at a first point.

Referring now to FIG. 4, the seat 22 of the first seating assembly 12 has a top side 34 and an underside 36 on the opposite side of the seat 22 as the top side 34. The top side 34 generally contacts and supports the occupant of the first seating assembly 12 during normal use. The underside 36 opposes the floor portion 20.

The first seating assembly 12 further includes a wiring harness 38 that extends between the underside 36 of the seat 22 and the floor portion 20. The wiring harness 38 is an assembly of electrical cables and/or wires bound together by a sleeve, electrical tape, cable ties, straps, and other means to bind together the electrical cables and/or wires. The wiring harness 38 can include wires utilized to transmit electric power to the first seating assembly 12, such as to power a motor (not illustrated) that moves the first seating assembly 12 to, from, and between the forward position 28 and the rearward position 30, and wires to transmit information from sensors, among other things. The wiring harness 38 can attach to, or connect with, the underside 36 of the seat 22 at a first point 40 along a length 42 of the wiring harness 38. The wiring harness 38 can terminate at the first point 40 with an electrical connector 44 received by (and thus forming an electrical connection with) a receiver (not illustrated) disposed at the underside 36 of the seat 22. The wiring harness 38 can extend into the floor portion 20, such as underneath a carpeting section (not illustrated) of the floor portion 20, at a second point 46 along the length 42 of the wiring harness 38. The wiring harness 38 thus extends from the underside 36 of the seat 22 at the first point 40, extends from the floor portion 20 at the second point 46, and has the length 42 extending at least from the first point 40 to the second point 46.

The first seating assembly 12 further includes a forward member 48 attached to the underside 36 of the seat 22 and engaged with the wiring harness 38. More specifically, the forward member 48 has a first portion 50 attached to the underside 36 of the seat 22, and a second portion 52 engaged with the wiring harness 38. The wiring harness 38 is engaged with the elastic member 48 at an engagement point 54 along the length 42 of the wiring harness 38, and the engagement point 54 is disposed between the first point 40 and the second point 46 along the length 42 of the wiring harness 38. The forward member 48 can be elastic, such as an elastic fabric, a spring, an elastomer or other like material that allows the forward member 48 to stretch or compress depending on the position of the wiring harness 38. In such embodiments, the second portion 52 of the forward member 48 can be attached to the wiring harness 38 at the engagement point 54 or surrounding the wiring harness 38 at the engagement point 52 allowing the wiring harness 38 to both slide within the wiring harness 38 and stretch/compress the forward member 48. Alternatively, the forward member 48 can be a non-elastic ring, hoop, or similar structure with a hole through which the wiring harness extends 38 and can slide while still being engaged with the forward member 48. The forward member 48 can be disposed forward of the first point 40 where the wiring harness 38 extends from the underside 36 of the seat 22, thus causing the wiring harness 38 to extend forward from the first point 40 to the attachment point 54. In general terms, the forward member 48 maintains the length 42 of the wiring harness 38 closer to the underside 36 of the seat 22 while allowing, via stretching or otherwise, the length 42 of the wiring harness 38 to change shape and position as the first seating assembly 12 moves toward the forward position 28 from the rearward position 30 or from a position between the forward position 28 and the rearward position 30.

The first seating assembly 12 further includes a harness engagement element 56. The harness engagement element 56 extends from the underside 36 of the seat 22, such as downward toward the floor portion 20. The harness engagement element 56 engages the wiring harness 38 at a location in the vehicle 10 below the underside 36 of the seat 22, and more specifically, between the underside 36 of the seat 22 and the floor portion 20. The harness engagement element 56 engages the wiring harness 38 between the first point 40 and the second point 46 of the wiring harness 38. More specifically, the harness engagement element 56 engages the wiring harness 38 between the second point 46 of the wiring harness 38 and the engagement point 54 where the wiring harness 38 engages with to the forward member 48. The harness engagement element 56 can be disposed such that the first portion 50 of the elastic member 48 is forward of the harness engagement element 56, and the first point 40 of the wiring harness 38 is rearward of the harness engagement element 56. In the illustrated embodiment, the harness engagement element 56 includes a hoop portion 58 and an opening 60 (see FIG. 5) through the hoop portion 58. The harness engagement element 56 engages the wiring harness 38 via the wiring harness 38 extending through the opening 60 of the hoop portion 58, and the hoop portion 58 at least partially surrounds the wiring harness 38. Although the hoop portion 58 of the illustrated embodiment entirely surrounds (encircles) the wiring harness 38, the hoop portion 58 need only partially surround the wiring harness 38 and could resemble a hook, with the hoop portion 58 not forming a complete circle but a three-quarter circle or less. As discussed further below, the harness engagement element 56 maintains the length 42 of the wiring harness 38 off of the floor portion 20 and closer to the underside 36 of the seat 22 while not being attached to the wiring harness 38. In other words, the wiring harness 38 is able to move relative to the harness engagement element 56 while being engaged by the harness engagement element 56. For example, the wiring harness 38 can move (e.g., slide) freely within the hoop portion 58 although the hoop portion 58 surrounds the wiring harness 38 and lifts the wiring harness 38 away from the floor portion 20. The wiring harness 38 can be disposed closer to the underside 36 of the seat 22 at the engagement point 54 where the wiring harness 38 is engaged with the forward member 48 than at where the harness engagement element 56 engages the wiring harness 38.

Figure 5:
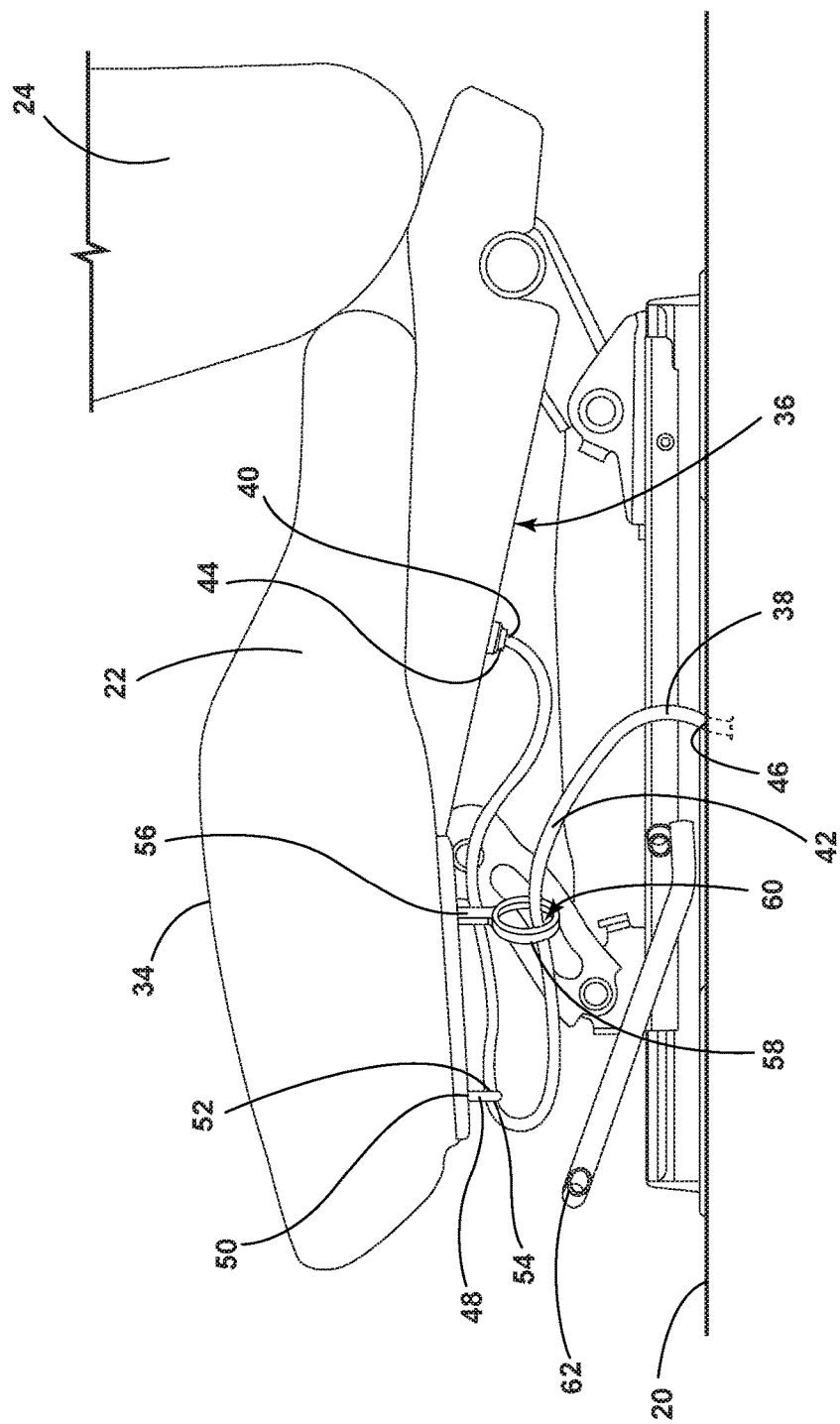
FIG. 5 is a side view of the seat of the first seating assembly of FIG. 1 over the floor portion when the first seating assembly is in a position between the forward position and the rearward position, illustrating a forward member attached to the underside of the seat and engaged with the wiring harness and the wiring harness extending through an opening of a hoop portion of a harness engagement element.
Figure 6:
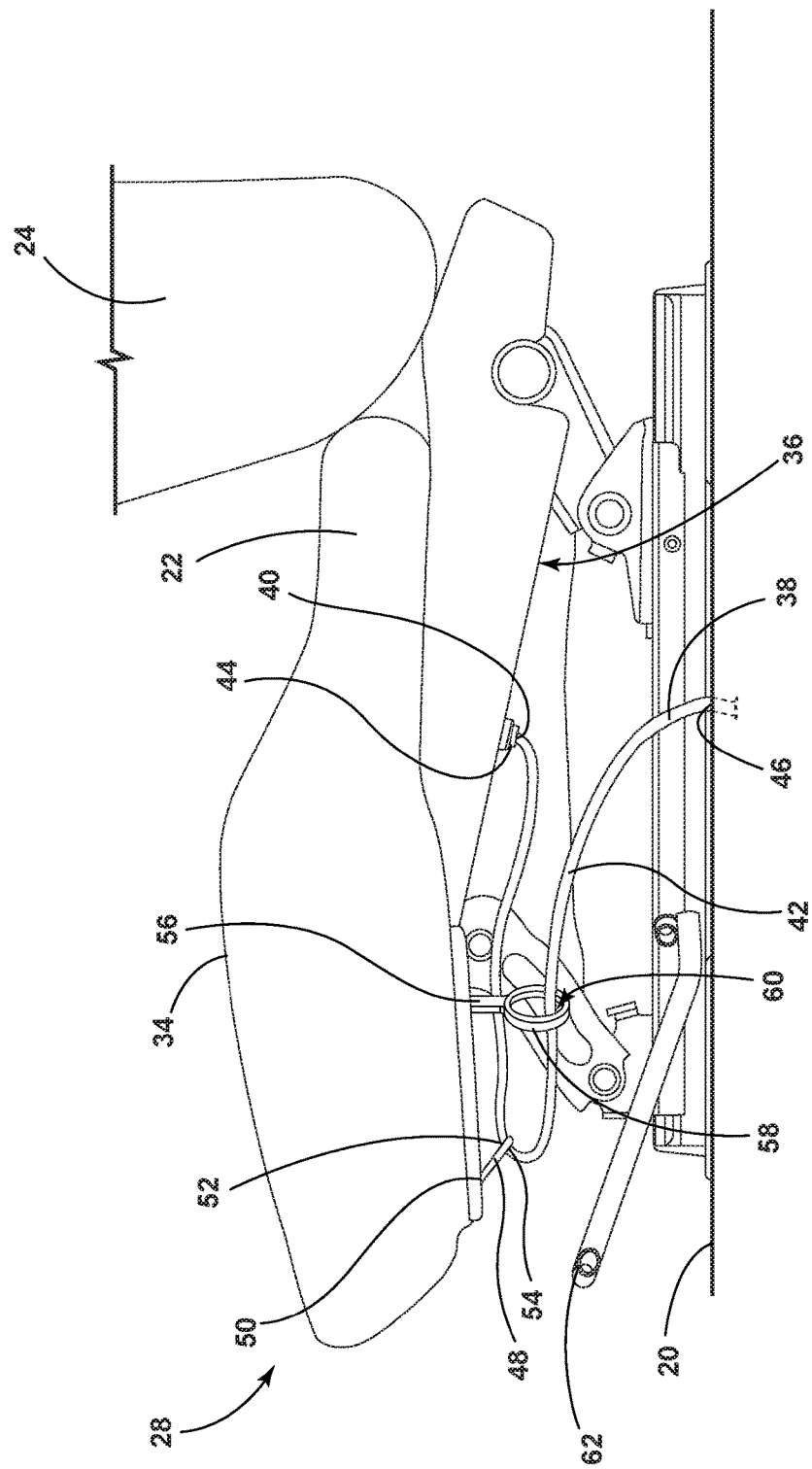
FIG. 6 is a side view of the seat of FIG. 1 over the floor portion when the first seating assembly is in the forward position, illustrating the wiring harness, engaged with the forward member, which is elastic, at an engagement point, causing the forward member to stretch.
Figure 7:
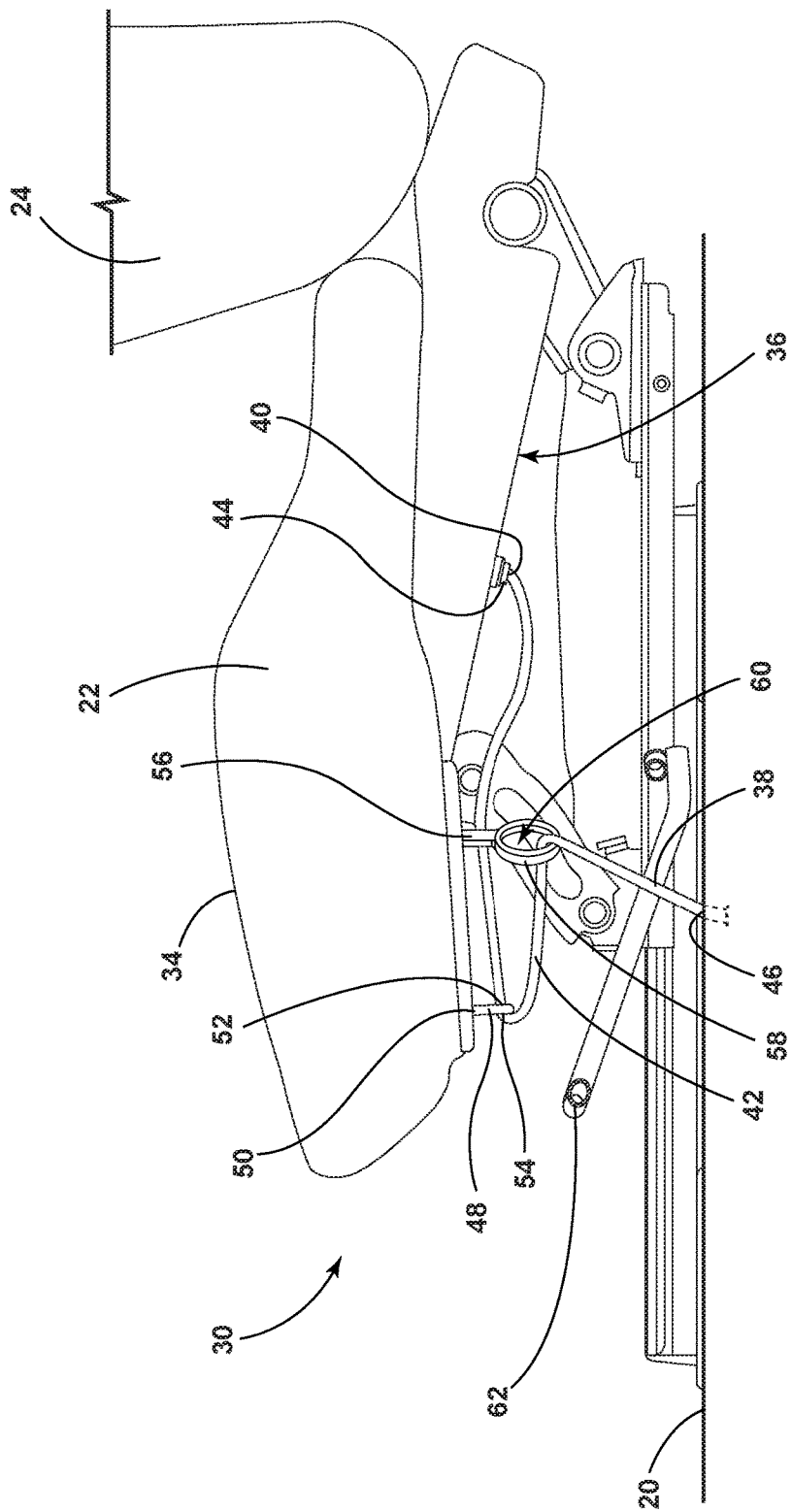
FIG. 7 is a side view of the seat of FIG. 1 over the floor portion when the first seating assembly is in the rearward position, illustrating the harness engagement element manipulating the wiring harness upward, off of the floor portion, and rearward to help conceal the wiring harness from view of an occupant of the vehicle.

Referring now to FIGS. 5-7, in an embodiment where the forward member 48 is elastic with the second portion 52 thereof attached to the wiring harness 38 at the engagement point 54, as the first seating assembly 12 moves from a position between (FIG. 5) the forward position 28 and the rearward position 30 toward the forward position 28 (FIG. 6), the forward member 48 stretches. That is, a distance between the first portion 50 and the second portion 52 of the forward member 48 increases. Because, in this embodiment, the wiring harness 38 is attached to the forward member 48 at the engagement point 54, the forward movement of the first seating assembly 12 (and thus the elastic member 48) causes the wiring harness 38 to become tauter between the engagement point 54 and the second point 46. The increased tautness of the wiring harness 38 causes the forward member 48 to stretch. The increased tautness of the wiring harness 38 additionally prevents the wiring harness 38 from lying upon floor portion 20 and instead lifts the wiring harness 38 upward toward the underside 36 of the seat 22. Because the harness engagement element 56 is also attached to the underside 36 of the seat 22, the forward movement of the first seating assembly 12 (and thus the harness engagement element 56) causes the wiring harness 38 to move through the opening 60 of the hoop portion 58 of the harness engagement element 56.

Next, as the first seating assembly 12 moves from the forward position 28 (FIG. 6) toward the rearward position 30 (FIG. 5), the forward member 48 contracts. The contraction of the forward member 48 causes the wiring harness 38 to move within the opening 60 of the hoop portion 58 of the harness engagement element 56, such as in a generally forward direction. In other words, the contraction of the forward member 48 pulls a portion of the length 42 of the wiring harness 38 through the opening 60.

As the first seating assembly 12 moves from a position between the forward position 28 and the rearward position 30 to the rearward position 30 (FIG. 7), the harness engagement element 56 pulls a portion of the length 42 of the wiring harness 38 rearward. The routing of the wiring harness 38 from the second point 46 at the floor portion 20, to engage the harness engagement element 56 (in the illustrated embodiment, through the opening 60 of the hoop portion 58), and to attach to the elastic member 48 before connecting to the first seating assembly 12 at the first point 40, prevents a portion of the length 42 of the wiring harness 38 from lying upon the floor portion 20. In the illustrated embodiment, when the first seating assembly 12 is in the rearward position 30, the harness engagement element 56 is disposed rearward of the second point 46 where the wiring harness 38 extends from the floor portion 20. Consequently, the harness engagement element 56 causes a portion of the length 42 of the wiring harness 38 to be disposed rearward of the second point 46 as well. Without utilizing the forward member 48 and the harness engagement element 56 to manipulate the wiring harness 38 in the above-described manner, the wiring harness 38 would lie upon the floor portion 20 and be visible to the occupant when the first seating assembly 12 is in the rearward position 30. By pulling the wiring harness 38 rearward and lifting the wiring harness 38 upward off of the floor portion 20 toward the underside 36 of the seat 22, the harness engagement element 56 prevents the wiring harness 38 from lying upon the floor portion 20 and hides the wiring harness 38 from view of the occupant. In addition, by lifting the wiring harness 38 upward off of the floor portion 20 toward the underside of the seat (and pulling the wiring harness 38 rearward while in the rearward position 30 or during a transition toward the rearward position 30), an occupant of the first seating assembly 12 attempting to grab a seat assembly adjustment lever 62 to reposition the first seating assembly 12 (or some other object between the seat 22 and the floor portion 20) will not inadvertently additionally grab the wiring harness 38.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
a floor portion;
a seating assembly disposed above and positionable relative to the floor portion,
the seating assembly comprising:
a seat including an underside opposing the floor portion;
a wiring harness extending between the underside of the seat and the floor portion, the wiring harness extending from the underside of the seat at a first point and extending from the floor portion at a second point;
a forward member with a first portion attached to the underside of the seat and a second portion engaged with the wiring harness; and
a harness engagement element attached to and extending from the underside of the seat and engaging the wiring harness between the underside of the seat and the floor portion, the first portion of the forward member being disposed forward of the harness engagement element, and the wiring harness is disposed closer to the underside where the second portion of the forward member engages the wiring harness than at where the harness engagement element engages the wiring harness.

2. The vehicle of claim 1,
wherein, the harness engagement element engages the wiring harness between the first point and the second point of the wiring harness.

3. The vehicle of claim 1,
wherein, the wiring harness is engaged with the forward member at an engagement point that is disposed between the first point and the second point.

4. The vehicle of claim 1,
wherein, the harness engagement element engages the wiring harness between the second point and an engagement point where the wiring harness is engaged with the forward member.

5. The vehicle of claim 1,
the seating assembly has a forward position and a rearward position rearward of the forward position; and
the seating assembly is movable to, from, and between the forward position and the rearward position.

6. The vehicle of claim 5,
wherein, the forward member is elastic; and
wherein, as the seating assembly is moved toward the forward position, the wiring harness causes the forward member to stretch.

7. The vehicle of claim 5,
the harness engagement element including a hoop portion with an opening through the hoop portion;
wherein, the hoop portion at least partially surrounds the wiring harness with the wiring harness extending through the opening of the hoop portion.

8. The vehicle of claim 7,
wherein, as the seating assembly is moved toward the forward position, the wiring harness moves through the opening of the hoop portion.

9. The vehicle of claim 6,
wherein, as the seating assembly is moved from the forward position toward the rearward position, the forward member contracts.

10. The vehicle of claim 7,
wherein, as the seating assembly is moved from the forward position toward the rearward position, the wiring harness moves within the opening of the hoop portion.

11. The vehicle of claim 5,
wherein, as the seating assembly moves to the rearward position, the harness engagement element pulls a portion of the wiring harness rearward.

12. The vehicle of claim 5,
wherein, when the seating assembly is in the rearward position, no portion of the wiring harness lies upon the floor portion.

13. The vehicle of claim 5,
wherein, when the seating assembly is in the rearward position, the harness engagement element causes a portion of the wiring harness to be disposed rearward of the second point where the wiring harness extends from the floor portion.

14. A seating assembly comprising:
a seat including an underside;
a wiring harness extending from the underside of the seat at a first point and having a length extending to a second point;
a forward member with a first portion attached to the underside of the seat and a second portion engaged with the wiring harness; and
a harness engagement element attached to and extending from the underside of the seat and engaging the wiring harness below the underside of the seat, the first portion of the forward member being disposed forward of the harness engagement element, and the wiring harness is disposed closer to the underside where the second portion of the forward member engages the wiring harness than at where the harness engagement element engages the wiring harness.

15. The seating assembly of claim 14,
wherein, the wiring harness is engaged with the forward member at an engagement point that is disposed between the first point and the second point.

16. The seating assembly of claim 14,
wherein, the harness engagement element engages the wiring harness between the first point and the second point of the wiring harness.

17. The seating assembly of claim 14,
wherein, the harness engagement element engages the wiring harness between the second point and an engagement point where the wiring harness is engaged with the forward member.

18. The seating assembly of claim 14,
the harness engagement element includes a hoop portion with an opening through the hoop portion; and
the hoop portion of the harness engagement element at least partially surrounds the wiring harness with the wiring harness extending through the opening of the hoop portion.

19. The seating assembly of claim 14,
wherein, the first portion of the forward member is forward of the harness engagement element, and the first point of the wiring harness is rearward of the harness engagement element.

20. A vehicle comprising:
a floor portion;
a seating assembly disposed above and positionable relative to the floor portion to, from, and between a forward position and a rearward position;
the seating assembly comprising:
- a seat including an underside opposing the floor portion;
- a wiring harness extending between the underside of the seat and the floor portion, the wiring harness extending from the underside of the seat at a first point and extending from the floor portion at a second point;
- a forward member with a first portion attached to the underside of the seat and a second portion engaged with the wiring harness at an engagement point that is disposed between the first point and the second point; and
- a harness engagement element attached to and extending from the underside of the seat and engaging the wiring harness between (i) the underside of the seat and the floor portion and (ii) the second point and the engagement point where the forward member is engaged with the wiring harness, the harness engagement element including a hoop portion with an opening and the wiring harness extends through the opening, and the first portion of the forward member is disposed forward of the harness engagement element;
as the seating assembly is moved toward the forward position, the wiring harness moves through the opening of the hoop portion; and
as the seating assembly moves to the rearward position, the harness engagement element pulls a portion of the wiring harness rearward.

* * * * *